United States Patent [19]

Shibuya

[11] Patent Number: 5,278,960
[45] Date of Patent: Jan. 11, 1994

[54] INFORMATION PROCESSING APPARATUS HAVING DETECTING MEANS FOR OPERAND OVERLAPS

[75] Inventor: Toshiteru Shibuya, Tokyo, Japan

[73] Assignee: NEC Corporation, Tokyo, Japan

[21] Appl. No.: 928,641

[22] Filed: Aug. 13, 1992

Related U.S. Application Data

[63] Continuation of Ser. No. 568,030, Aug. 16, 1990, abandoned.

[30] Foreign Application Priority Data

Aug. 16, 1989 [JP] Japan .................. 1-212048

[51] Int. Cl.⁵ .................. G06F 9/34; G06F 12/02
[52] U.S. Cl. .................. 395/375; 395/425; 364/260; 364/260.2; 364/246; 364/246.11; 364/246.2; 364/263; 364/259.2; 364/DIG. 1
[58] Field of Search .......... 395/375, 275, 425, 400, 395/800; 340/825.07; 370/17; 365/189.01, 230.01

[56] References Cited

U.S. PATENT DOCUMENTS

| | | | |
|---|---|---|---|
| 3,811,114 | 5/1974 | Lemay et al. | 364/200 |
| 4,047,244 | 9/1977 | Finkemeyer et al. | 364/200 |
| 4,398,245 | 8/1983 | Fujita | 364/200 |
| 4,583,165 | 4/1986 | Rosenfeld | 364/200 |
| 4,652,991 | 3/1987 | Yamano | 364/200 |
| 4,797,851 | 1/1989 | Suzuki | 364/900 |
| 4,916,606 | 4/1990 | Yamaoka et al. | 364/200 |
| 5,099,416 | 3/1992 | Tanaka et al. | 395/425 |

OTHER PUBLICATIONS

Ngai et al., "Destructive Overlap Detection Hardware", IBM Technical Disclosure Bulletin, vol. 19, No. 1, Jun. 1976, pp. 61-64.

*Primary Examiner*—Gopal C. Ray
*Attorney, Agent, or Firm*—Foley & Lardner

[57] ABSTRACT

An information transfer apparatus for transferring memory operand data from a source address in a memory region to a destination address, including a first and second data overlap detecting circuits. If either detecting circuit indicates that data overlap is not present, the data transfer takes place word-by-word. In the case overlap is present, the data is transferred in bytes. The first detecting circuit checks for overlap by comparing the values and identities of predetermined bits in the source address and destination address. The second detecting circuit calculates the difference between the source and destination address and compares this difference to the length of the source operand data to be transferred.

7 Claims, 5 Drawing Sheets

INFORMATION PROCESSING APPARATUS HAVING DETECTING MEANS FOR OPERAND OVERLAPS

This application is a continuation of application Ser. No. 07/568,030, filed Aug. 16, 1990, now abandoned.

BACKGROUND OF THE INVENTION

The present invention relates to an information processing apparatus for executing a data transfer instruction to store data or information stored at one address of a memory to another address of the same memory.

A transfer instruction usually includes a source address, a destination address and a designation of the lengths of the operands to be transferred. The source address is the address of the source, and the destination address, that of the destination, in said memory.

Some transfer instructions require the transfer of operand data byte by byte from the source operand data region (hereinafter called source operands) to the destination operand data region (hereinafter called destination operands).

Generally, data reading out of or writing into a main storage or a cache memory in an information processing apparatus takes place word by word, each word having a fixed length of four bytes or eight bytes. Therefore, other transfer instructions requires the transfer of data, instead of byte by byte, in four-byte or eight-byte words. This word-by-word data transfer realizes improved performance in the execution of transfer instructions than a byte-by-byte data transfer. Where the source operands include a destination address in a word-by-word data transfer, there arises the problem of difference in results between byte-by-byte and word-by-word transfers.

If address regions overlap one another in such data transfer, the execution of the transfer instruction should be so altered as to transfer the data byte by byte, instead of word by word.

For one example of a technique to improve the performance of executing a transfer instruction where such an overlap is present, reference may be made to the U.S. Pat. No. 4,652,991.

Irrespective of improving the performance in an overlapping situation, however, there is the need to detect any destructive overlapping of operands. The aforementioned U.S. Pat. No 4,652,991 also describes an example of such detecting technique.

Usually, this detection uses the source address, destination address and source operand length to check whether or not the following condition holds:

---
source address ≦ destination address < (source address + source operand length)
---

This detecting system, however, first of all requires for the detection of any destructive overlap the equal availability of the source address, destination address and source operand length.

It further requires the arithmetic operation of adding the source address and the source operand length, comparison of the relative magnitudes of elements in two combinations, one between the source address and the destination address and the other between the destination address and the source address plus the source operand length, arithmetic operation of subtracting the source address from the destination address, and comparison of the relative magnitudes between the balance of the subtraction of the source address from the destination address and the source operand length.

Therefore, the detection of any destructive overlap would take a considerable length of time. Moreover, even if there is no destructive overlap, the data transfer is started after the absence of destructive overlap is detected, so that it is difficult to improve the performance of executing transfer instructions even though data are transferred word by word.

An object of the present invention is to provide an information transfer apparatus cleared of the above-mentioned disadvantage and capable of improving the performance of executing transfer instructions.

SUMMARY OF THE INVENTION

According to one aspect of the invention, there is provided an information transfer apparatus for executing a data transfer instruction to transfer memory operand data beginning with a source address designated by the instruction to a memory region beginning with a destination address designated by the same instruction, comprising first overlap detecting means for generating an "overlap processing unnecessary" signal indicating that the data transfer instruction can be executed in word-by-word processing on the basis of said source address and said destination address, and second overlap detecting means for comparing the magnitude of the difference between the destination address and the source address with that of a source operand length and generating an "overlap processing request" signal.

According to another aspect of the invention, there is provided an information transfer apparatus for executing a data transfer instruction to transfer memory operand data beginning with a source address designated by the instruction to a memory region beginning with a destination address designated by the same instruction, comprising a first detecting circuit for detecting non-identity between predetermined bits in the source address and the destination address; a second detecting circuit for detecting identity between predetermined bits in the source address and the destination address; a third detecting circuit for detecting whether a predetermined bit in the source address or the destination address is "0" or "1"; and a decision circuit for controlling the execution of a data transfer instruction with the outputs of said first, second and third detecting circuits.

BRIEF DESCRIPTION OF THE DRAWINGS

The features, objects and advantages of the present invention will become more apparent from the following detailed description when taken in conjunction with the accompanying drawings, in which.

In the figures, the same reference numerals denote respectively the same constituent elements.

DETAILED DESCRIPTION OF THE PREFERRED EMBODIMENT

Figure 1:
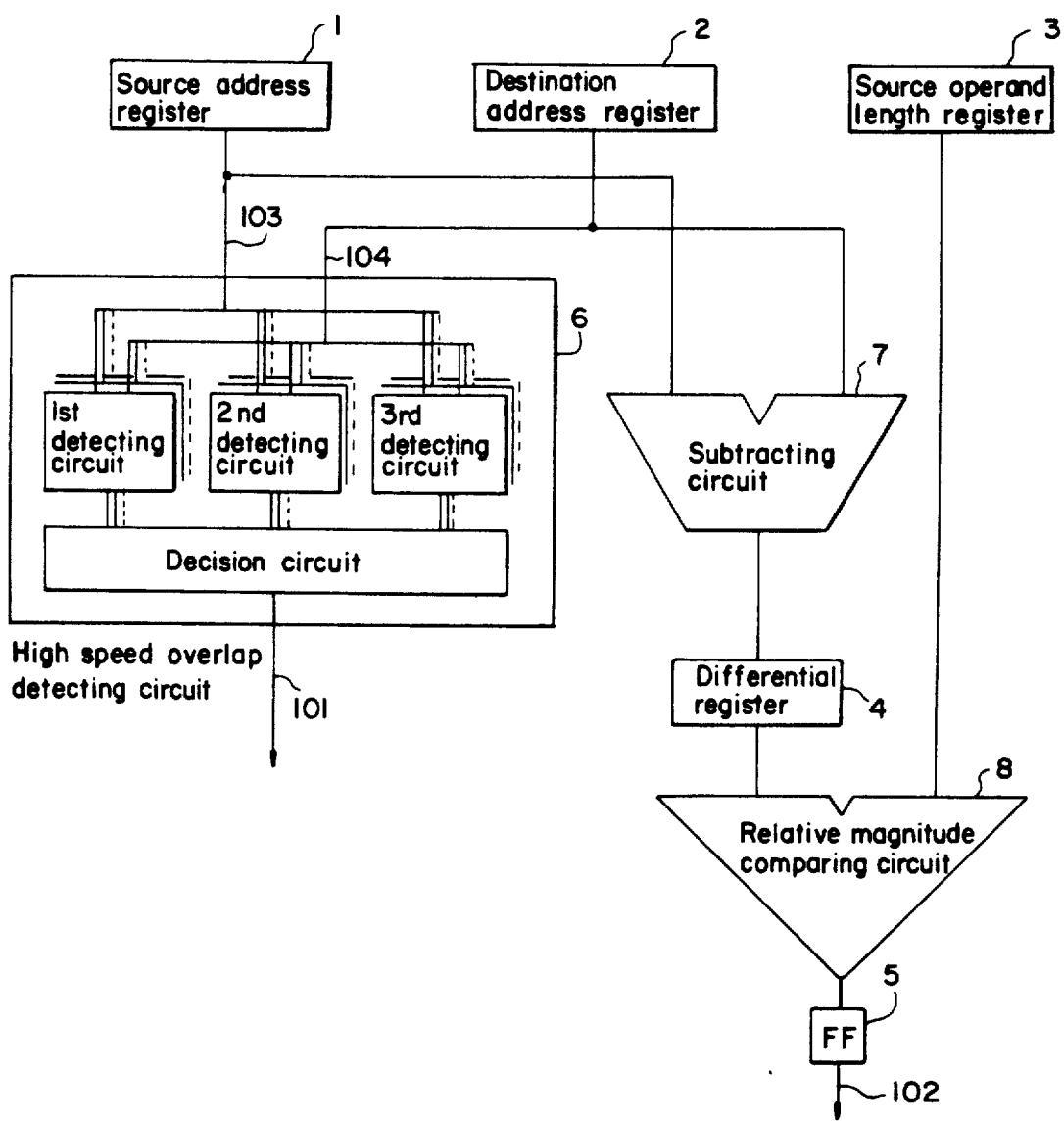
FIG. 1 illustrates the configuration of a preferred embodiment of the invention.

Referring to FIG. 1, a preferred embodiment of the present invention is provided with a source address register 1 for storing a source address, which indicates the source of transfer, given from an instruction deciphering section (not shown); a destination address register 2 for storing a destination address, which indicates the destination of transfer, given from the instruction deciphering section (not shown); a source operand length register 3 for storing a source operand length, which indicates the length of the operand to be transferred, given from the instruction deciphering section (not shown); a high speed overlap detecting circuit 6 for generating, and sending out to a line 101, an "overlap processing unnecessary" signal indicating, on the basis of the source address provided from the source address register 1 via a line 103 and the destination address provided from the destination address register 2 via a line 104, that the transfer instruction may be executed at least in word-by-word processing; a subtracting circuit 7 for subtracting the source address from the source address register 1 from the destination address from the destination address register 2; a differential register 4 for storing the difference calculated by the subtracting circuit 7; a relative magnitude comparing circuit 8 for comparing the relative magnitudes of the difference from the differential register 4 and the operand length from the source operand length register 3 and supplying "1" both when the source operand length is greater than 16 bytes and the difference is less than 16 bytes and when the operand length is not greater than 16 bytes and the difference is smaller than the source operand length; and a flip-flop (F/F) 5 for supplying the output of the circuit 8, after holding it for one machine cycle, to a signal line 102 as an "overlap processing request" signal.

Word-by-word processing of a transfer instruction in the preferred embodiment of the present invention in the absence of destructive overlap will be described in detail below with reference to FIG. 2.

Figure 2:
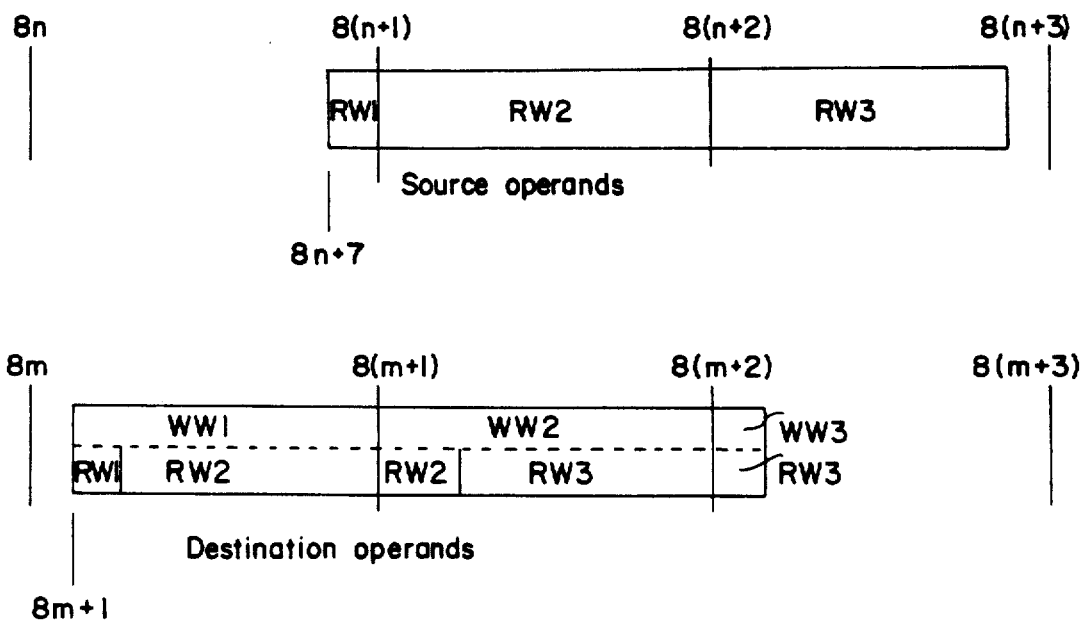
FIGS. 2 and 3 illustrate the arrangements of the operands of a transfer instruction on a memory.

FIG. 2 shows operands on a memory when the source address is 8n+7, the source operand length is 16 bytes and the destination address is 8m+1. Since data are fed, in the preferred embodiment of the invention, to or from a memory in eight-byte word units, the source operands are read out, split into three parts including RW1, RW2 and RW3 in three readings of eight-byte units.

Meanwhile, the destination operands are also written as split into three parts, including WW1, WW2 and WW3 in three eight-byte units.

A transfer instruction may be processed by first reading all the source operands and then writing them into the destination address, but this would require too large a hardware capacity to store the operand data read out. Therefore, in this preferred embodiment, reading and writing are accomplished substantially in parallel.

Referring to FIG. 2, writing of the first data part WW1 requires its preparation from the read-out parts RW1 and RW2. Therefore, the first writing should be preceded by at least two source operand reading actions.

Depending on the relationship between the source address and the destination address, the first write data may become ready in only one reading action. For the sake of control ease, however, if all the source operands cannot be read out in a single reading action, the source operands are always read out two consecutive times. After that, writing and reading are alternately repeated and, upon completion of the reading of the source operands, writing is further continued until the writing of the destination operands is completed.

Figure 3:
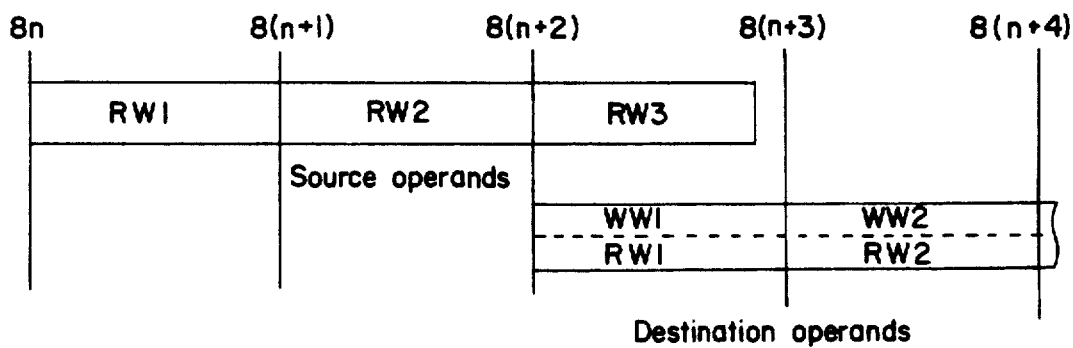

The processing method described above, even where there is a destructive overlap of operands as illustrated in FIG. 3, makes it possible for processing in eight-byte words to give the same result as byte-by-byte processing if the destination address is greater than the source address by 16 bytes or more. Therefore, word-by-word processing is not allowed only when one of the following conditions holds:

--- source operand length > 16 bytes and 1 ≦ (destination address − source address) < 16, or
source operand length ≦ 16 bytes and (destination address − source address) < source operand length

---

A logic to detect these conditions comprises the subtracting circuit 7, differential register 4, relative magnitude comparing circuit 8 and F/F 5.

The working of the logic will be described below with reference to FIGS. 1 and 4.

Figure 4:
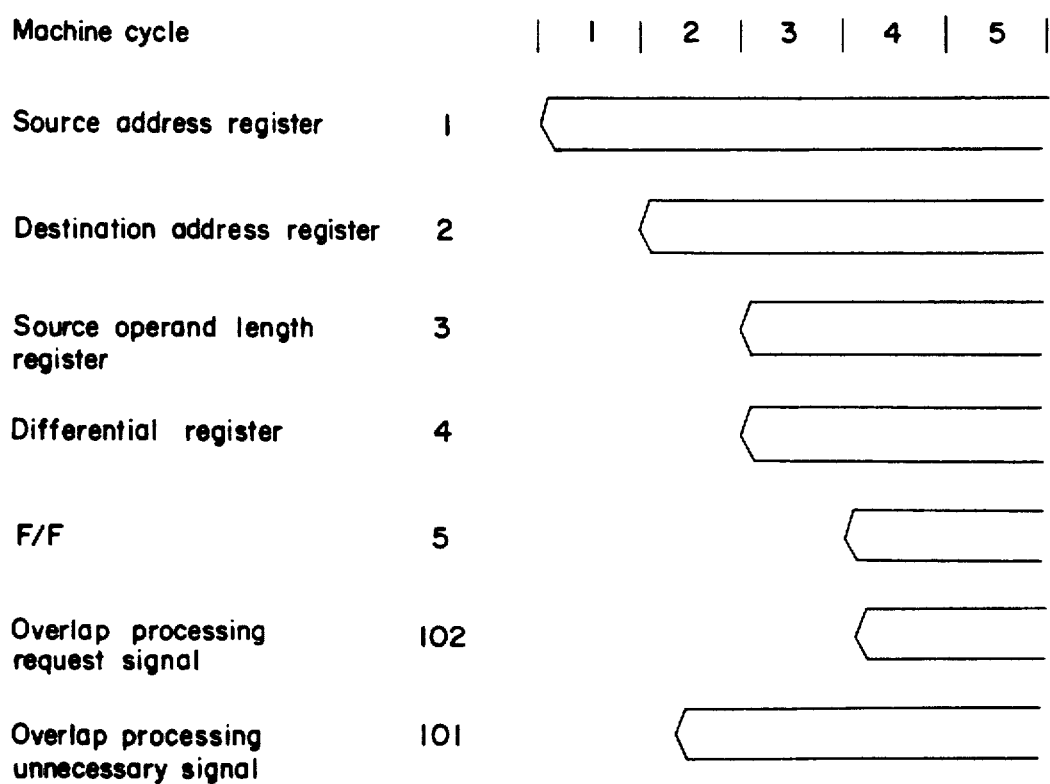
FIG. 4 is a time chart showing the operation of overlap detecting means in the preferred embodiment of the invention.

Referring first to FIG. 4, illustrating the working of the logic, the source address and the destination address are set in machine cycles 1 and 2, respectively. As soon as the source operand length is set in machine cycle 3, the balance of the subtraction of the source address from the destination address by the subtracting circuit 7 is set into the differential register 4. The output of the relative magnitude comparing circuit 8 is set into the F/F 5 in machine cycle 4, and the determination of the overlap processing request signal to be either "0" or "1" is during this machine cycle 4. Therefore, the actual start of word-by-word or byte-by-byte processing is no earlier than machine cycle 4.

Figure 5:
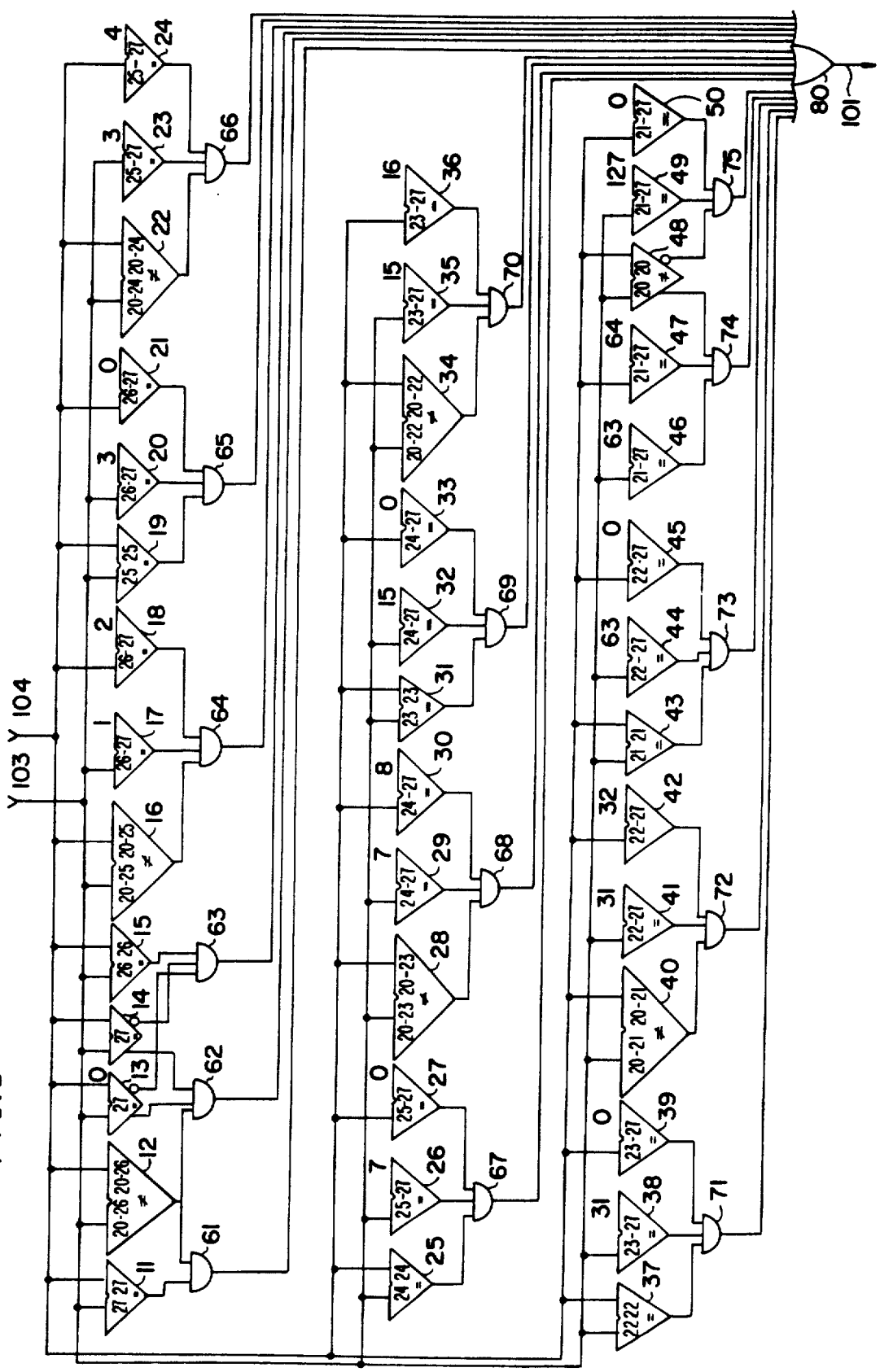
FIG. 5 illustrates the configuration of the high speed overlap detecting circuit 6 in the preferred embodiment shown in FIG. 1.

Next is described in detail the high speed overlap detecting circuit 6 in FIG. 1, with reference to FIG. 5.

The high speed overlap detecting circuit 6 is equipped with comparing circuits 11 to 50 for comparing the destination address provided via the signal line 104 with a fixed value. Both the source address and the destination address comprise 31 bits each, to each of which is assigned one of bit numbers 1 to 31.

In the following description, bit 27 of the source address will be denominated S27, and the seven bits 20 to 26 of the destination address, D20 to D26. The comparing circuits 11 and 12 are respectively intended for detecting identity between S27 and D27 and non-identity between S20 to S26 and D20 to D26.

The comparing circuits 13 and 17 are respectively intended for detecting whether or not S27 is "0" and whether or not the two bits S26 to S27 are "01". This high speed overlap detecting circuit 6 is further equipped with AND gates 61 to 75, an OR gate 80 and the signal line 101 for sending out an overlap processing unnecessary signal. With non-identity between S27 and D27 being expressed by S27≠D27 and identity between S20 to S26 and D20 to D26 by S20-26=D20-26, the logic of the high speed overlap detecting circuit illustrated in FIG. 5 is:

$$\begin{aligned}
&(S20 - 26 \neq D20 - 26) \cdot (S27 = D27) \\
&+ (S20 - 26 \neq D20 - 26) \cdot (S27 = 0) \cdot (D27 = 1) \\
&+ (S26 = D26) \cdot (S27 = 1) \cdot (D27 = 0) \\
&+ (S20 - 25 \neq D20 - 25) \cdot (S26 - S27 = 01) \cdot (D26 - 27 = 10) \\
&+ (S25 = D25) \cdot (S26 - 27 = 11) \cdot (D26 - 27 = 00) \\
&+ (S20 - 24 \neq D20 - 24) \cdot (S25 - 27 = 011) \cdot (D25 - 27 = 100) \\
&+ (S24 = D24) \cdot (S25 - 27 = 111) \cdot (D25 - 27 = 000) \\
&+ (S20 - 23 \neq D20 - 23) \cdot (S24 - 27 = 0111) \cdot (D24 - 27 = 1000) \\
&+ (S23 = D23) \cdot (S24 - 27 = 1111) \cdot (D24 - 27 = 0000) \\
&+ (S20 - 22 \neq D20 - 22) \cdot (S23 - 27 = 01111) \cdot (D23 - 27 = 10000) \\
&+ (S22 = D22) \cdot (S23 - 27 = 11111) \cdot (D23 - 27 = 00000) \\
&+ (S20 - 21 \neq D20 - 21) \cdot (S22 - 27 = 011111) \cdot (D22 - 27 = 100000) \\
&+ (S21 = D21) \cdot (S22 - 27 = 111111) \cdot (D22 - 27 = 000000) \\
&+ (S20 \neq D20) \cdot (S21 - 27 = 0111111) \cdot (D21 - 27 = 1000000) \\
&+ (S20 = D20) \cdot (S21 - 27 = 1111111) \cdot (D21 - 27 = 0000000)
\end{aligned}$$

This logic negates the minimum sufficient condition obtained from the eight bits 20 to 27 each of the source address and destination address satisfying the condition of:

$$1 \leq \text{(destination address - source address)} < 16$$
where word-by-word processing is unacceptable.

It is therefore guaranteed that, if the output of the logic of FIG. 5 is "1", at least word-by-word processing can be allowed.

Since this logic takes no account of the source operand length, its output will not be "1" even if the operands are short and do not overlap each other. Furthermore, as it takes account of only eight bits out of the 31-bit address, its output may not be always "1" even if the source operand length is greater than 16 bytes and the source and destination addresses are apart from each other by 16 bytes or more. However, supposing that source and destination addresses are distributed in equal probabilities, the overlap processing unnecessary signal on the signal line 101 will be "1" in 99.2% of all the combinations of addresses.

Now will be described in detail the operation of the preferred embodiment of the present invention with reference to drawings.

Referring to FIGS. 1 and 4 together, in response to the setting of the source and destination addresses into the source address register 1 and the destination address register 2 in machine cycles 1 and 2, respectively, the high speed overlap detecting circuit 6 fixes the overlap processing unnecessary signal at either "0" or "1" in machine cycle 2. Further in response to the setting of the source operand length into the source operand length register 3 in machine cycle 3, the overlap processing request signal it fixed at either "1" or "0" in machine cycle 5. If the overlap processing unnecessary signal is fixed at "1" in machine cycle 2, the overlap processing request signal obviously will not become "1" in machine cycle 4.

Figure 6:
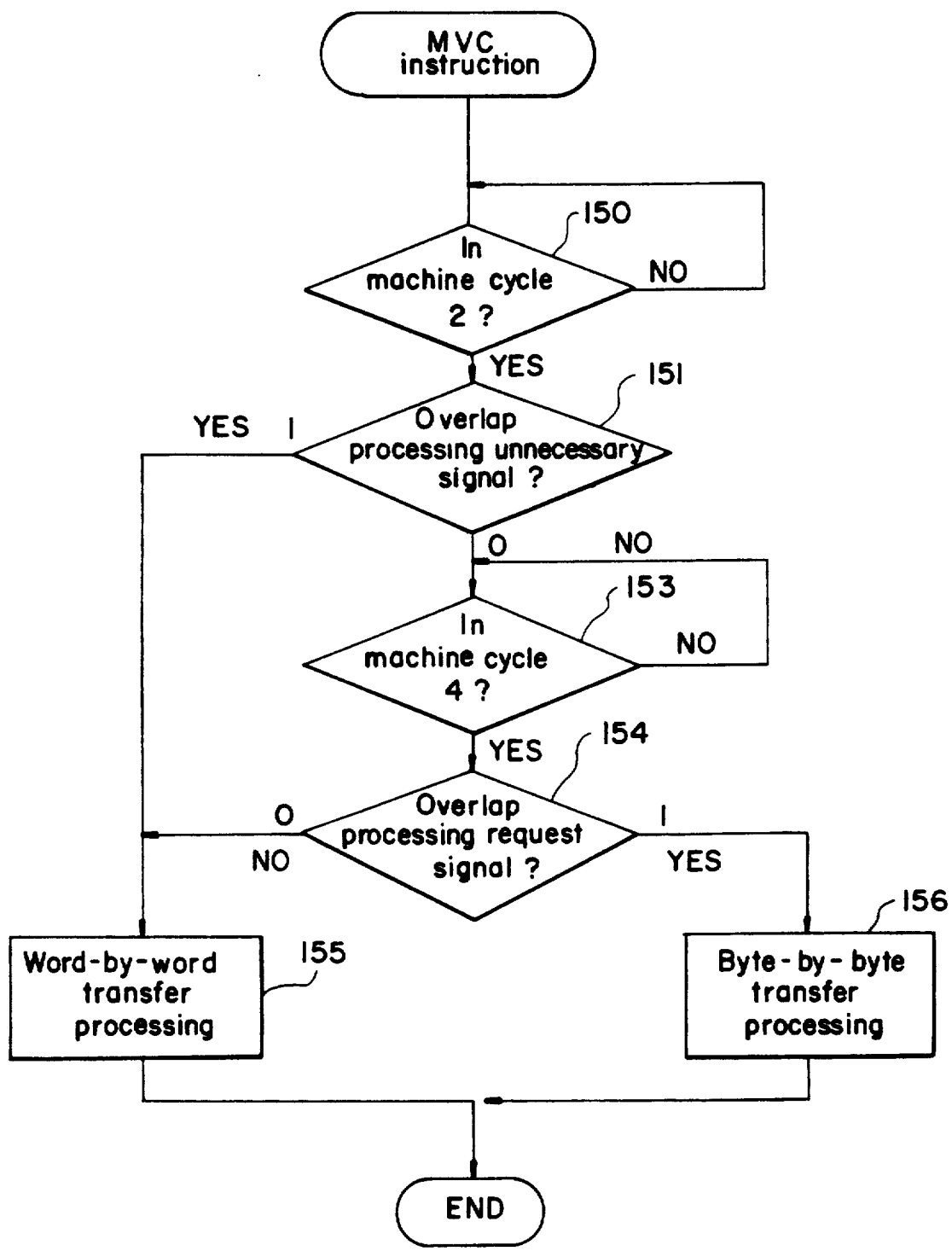
FIG. 6 is a flow chart showing the operation of the preferred embodiment of the invention.

Referring to FIG. 6, in the processing by the preferred embodiment of the invention, machine cycle 2 is first awaited (step 150), and the overlap processing unnecessary signal is tested in machine cycle 2 (step 151). As soon as the overlap processing unnecessary signal turns "1", the processing of a word-by-word transfer is started (step 155). If the overlap processing unnecessary signal is "0", machine cycle 4 will be awaited (step 153). The overlap processing request signal is tested in machine cycle 4 (step 154) and, if it is found "0", the processing of a word-by-word transfer will be performed (step 155) or, if it is found "1", the processing of a byte-by-byte transfer will be accomplished (step 156).

In this case, word-by-word processing is started in machine cycle 2 for 99.2%, and either word-by-word or byte-by-byte processing is begun in machine cycle 4 only for the remaining 0.8%. The performance of MVC instruction execution is advanced by as much as 1.984 cycles $$2 \text{ cycles} \times \frac{99.2\%}{100\%} = 1.984 \text{ cycles}$$

on an average, compared with the prior art by which either word-by-word or byte-by-byte processing is started always in machine cycle 4.

As the high speed overlap detecting circuit 6 used in the present invention can be composed of much smaller numbers of gates and gate stages than the subtracting circuit or the relative magnitude comparing circuit, such an improvement in performance can be achieved. Further by increasing or decreasing the number of bits of addresses to be compared, any desired degree of accuracy can be attained.

The relationships between the bits compared, the level of accuracy and the advancement of performance are shown in Table 1.

TABLE 1

| Bits compared | Accuracy level | Performance advancement |
|---|---|---|
| 2 bits (26–27) | 50% | 1 machine cycle |
| 5 bits (23–27) | 93.7% | 1.874 machine cycles |
| 8 bits (20–27) | 99.2% | 1.984 machine cycles |
| 11 bits (17–27) | 99.90% | 1.998 machine cycles |
| 15 bits (13–27) | 99.993% | 1.99986 machine cycles |

Therefore, the number of bits to be compared can be determined according to the required performance level and the number of gates assigned to the high speed overlap detecting circuit.

If the nature of the software to be executed by the information processing apparatus embodying the present invention is known in advance, the logic of the high speed overlap detecting circuit can be altered by, for instance, replacing $(S20 - \neq 26 \; D20 - 26)$ with $(S1 - 27 \neq D1 - 27)$, according to the distribution of the source and destination addresses of transfer instructions involved in that particular software to provide an information processing apparatus further excelling-in cost-effectiveness.

One example of the case that the bit 27 of the source address is not equal to the bit 27 of the destination address is as follows:

The bit 27 of the source address is "0", and the bit 27 of the destination address is "1". In this case, when the bits 24-26 of the source address are not equal to the bits 24-26 of destination address, the source address shows "0 . . . 0110000". A difference between the destination address and the source address greater than 33 can be assured.

Another example is as follows:

In this case, the bit 27 of the source address shows "1" and the bit 27 of the destination address shows "0".

When the bits 26-27 of the source address shows "1" and the bit 27 of the destination address shows "0".

When the bits 26-27 of the source address show "01" and the bits 26-27 of the destination address show "10" and, when the bits 24-25 of the source address are not equal to the its 24-25 of the destination address, the source address shows "0 . . . 0001111" and the destination address shows "0 . . . 01100000". A difference between the destination address and the source address greater than 65 can be measured.

In the case where the bits 26-27 of the source address show "11" and the bits 26-27 of the destination address show "00", when the bits 25-27 of the source address show "011" and the bits 25-27 of the destination address shown "100" and when the bit 24 of the source address is not equal to the bit 24, of the destination address, the source address shows "0 . . . 011000000". A difference between the destination address and the source address greater than 129 can be assured.

Next is described the case of the source address > the destination address.

The following are conditions for not allowing the execution of the work processing:

```
source operand length > 16 bytes and 1 ≦
(destination address − source address) < 16,
or
source operand length ≦ 16 bytes and 1 ≦
(destination address − source address) < source
operand length.
```

If the condition, that is 0≦(destination address −source address)<16, which is broader than the above conditions, is used, instead of the above conditions, word processing can be executed, and the cases where byte processing is executed is increased.

Next is described the manner of generating the broader condition without adding and/or subtracting source address and destination address.

Both of the source and destination addresses have 31 bits, each of which is numbered from 1 to 31. The broader condition is satisfied with the condition that the destination address−the source address is greater than 16. Accordingly, the lower four bits of the source and destination addresses can be ignored.

The worst case is the one that the lower four bits of the source address are "1111", and the lower four bits of the destination address are "0000".

Under this worst case condition, as to bits 24, 25, 26 and 27, when the bit 27 of the source address is equal to the bit 27 of the destination address and when the bits 24, 25 and 26 of the source address are not equal to the bits 24, 25 and 26 of the destination address, the source address is "0 . . . 0001111" and the destination address is "0 . . . 010000". A difference between the destination address and the source address greater than 17 can be assured. This condition is expressed as $(S24-26 \neq D24-26) \cdot (S27=D27)$.

S27 and D27 show the bit 27 of the source and destination address, respectively. "S24−26" show the bits 24−26 of the source address.

One example of this case is that the bit 26 of the source address is equal to that of bit 26 of the destination address, and the bit 27 of the source address shows "1", and the bit 27 of the destination address shows "0".

Another example of this case is that the logical state of the bit 25 of the source address is equal to that of the destination address, and the bits 26-27 of the source address show "11" and the bits 26-27 of the destination address show "00".

Still another example of this case is that the bit 24 of the source address is equal to that of the destination address, and the bits 25-27 of the source address show "111" and the bits 25-27 of the destination address show "111".

The above-mentioned examples of various cases are summarized as follows:

$$(S24 - 26 \neq D24) - D26) \cdot (S27 = D27)$$
$$+ (S24 - 26 \neq D24 - 26) \cdot (S27 \neq 0) \cdot (D27 = 1)$$
$$+ (S27 = D26) \cdot (S27 = 1) \cdot (D27 = 0)$$
$$+ (S24 - 25 \neq D24 - 25) \cdot (S26 - 27 = 01) \cdot (D26 - 27 = 10)$$
$$+ (S25 = D25) \cdot (S26 - 27 = 11) \cdot (D26 - 27 = 00)$$
$$+ (S24 \neq D24) \cdot (S25 - 27 = 011) \cdot (D25 - 27 = 100)$$
$$+ (S24 = D24) \cdot (S25 - 27 = 0111) \cdot (D25 - 27 = 000).$$

This condition shows lower bits corresponding to a length of two words in the bits showing the source address and the destination address, respectively. That is, in the present case, one word consists of four bytes, while two words correspond to eight bytes.

As to the two word address (double-word-address) except for lower three bits, a double-word-address shows the remaining bits except for any upper bits. For instance, note the upper 20 bits in the example at page 20 and the upper 24 bits in the example at page 14 of the original English text in the double-word-address.

The condition mentioned above means that the detecting circuit 6 detects the combination of the bit pattern in which the source double-word-address is greater than the destination double-word-address and the combination of bit pattern in which the destination double-word-address is greater than the source double-word-address plus one. The equation of the condition means that a few bits of the source address are not equal to a few bits of destination address (for example: $S24-26 \neq D \geq -26$).

The detection operation is performed by a first detecting circuit in block 6 of FIG. 1. The detection that a few bits of the source address is equal to a few bits of the destination address (for example: S27=D27), is performed by second detecting circuit in block 6 of FIG. 1, as is detection of whether predetermined bit is "0" or "1". As a result, the detection circuit 6 detects the case where word processing is inhibited.

The double-word-address of this embodiment of the invention is an address except for the lower three bits corresponding to two word lengths showing the source address and the destination address. In this embodiment, one word in four bytes, and two words are eight bytes ($2^3=8$). The short double-word-address is the address except for the upper 20 bits in one example and the upper 14 bits in another example, in the bit low showing double-word-addresses mentioned above. This condition corresponds to the detecting of the combination of the bit pattern that the source double-word address is greater than the short destination double-word address, and detecting that the combination of the bit pattern that results from subtracting the short source double-word address from the short destination double-word-address is greater than 1.

As hitherto described, the present invention has the advantage that cases in which no high speed overlap processing is required are detected by checking the identity or non-identity between bits in source and destination addresses or whether such bits are "0" or "1", and the method to execute transfer instructions are controlled accordingly, resulting in improved performance to execute such instructions.

Although an overlap detecting circuit according to the prior art is also used in the above described preferred embodiment, this is not an essential part of the invention, but it is also possible to structure the information processing apparatus having only a high speed overlap detecting circuit and to let it immediately start byte-by-byte processing unless the overlap processing unnecessary signal turns "1" in machine cycle 2.

What is claimed is:

1. An information transfer apparatus for executing a data transfer instruction to transfer memory operand data in one of a word-by-word and byte-by-byte manner beginning with a source address designated by the instruction to a memory region beginning with a destination address designated by said instruction, the apparatus comprising:
   first overlap detecting means comprising a high speed overlap detecting circuit operating in a given machine cycle for generating an overlap processing unnecessary signal indicating in a first logic state that overlap processing is unnecessary and that the transfer instruction may be executed by word-by-word processing, and indicating in a second logic state that the selection between word-by-word and byte-by-byte transfer is to be performed in a later machine cycle, said circuit including means for generating said overlap processing unnecessary signal on the basis of the source address and the destination address; and
   second overlap detecting means, including a comparing circuit, for comparing the magnitude of the difference between said destination address and said source address with that of a source operand length and generating an overlap processing request signal indicating in a first logic state that a data transfer instruction is to be executed in a byte-by-byte manner, and in a second logic state that the data transfer instruction is to be executed in a word-by-word manner, said overlap processing unnecessary signal generated in said given machine cycle occurring before generation of said overlap processing request signal generated in said latter machine cycle.

2. An information transfer apparatus, as claimed in claim 1, wherein said high speed overlap detecting circuit comprises:
   a first detecting circuit for detecting non-identity between predetermined bits indicative of said source address and other predetermined bits representative of said destination address;
   a second detecting circuit for detecting identity between predetermined bits in said source address and said destination address;
   a third detecting circuit for detecting whether a predetermined bit in said source address or said destination address is "0" or "1"; and
   a decision circuit for controlling the execution of a data transfer instruction by comparing the relationship between the outputs of said first, second and third detecting circuits.

3. An information transfer apparatus for executing a data transfer instruction to transfer memory operand data in one of a word-by-word and byte-by-byte manner beginning with a source address designated by the instruction to a memory region beginning with a destination address designated by said instruction, the apparatus comprising:
   a source address register;
   a destination address register;
   a source operand length register;
   first overlap detecting means comprising a high speed overlap detecting circuit operating in a given machine cycle for generating an overlap processing unnecessary signal indicating in a first logic state that overlap processing is unnecessary and that the transfer instruction may be executed by word-by-word processing, and indicting in a second logic stat that the selection between word-by-word and byte-by-byte transfer is to be performed in a later machine cycle, said circuit including means for generating said overlap processing unnecessary signal on the basis of the source address provided from said source address register and the destination address provided from said destination address register; and
   second overlap detecting means, including a comparing circuit, for comparing the magnitude of the difference between said destination address and said source address with that of a source operand length and generating an overlap processing request signal indicating in a first logic state that a data transfer instruction is to be executed in a byte-by-byte manner, and in a second logic state that the data transfer instruction is to be executed in a word-by-word manner, said overlap processing unnecessary signal generated in said given machine cycle occurring before generation of said overlap processing request signal generated in said latter machine cycle.

4. The information transfer apparatus of claim 3, in which the first overlap detecting means includes:
   a first detecting circuit for detecting non-identity between predetermined bits indicative of the source address and other predetermined bits indicative of the destination address;
   a second detecting circuit for detecting identity between predetermined bits in the source address and the destination address;
   a third detecting circuit for detecting whether a predetermined bit in the source address or the destination address is a "0" or a "1"; and
   a decision circuit for executing the instruction depending on the predetermined bit in the source address and the relationship between outputs of the first, second and third detecting circuits.

5. The information transfer apparatus of claim 4, further including a differential register in the second overlap detecting means for storing the difference determined by a subtracting circuit prior to comparison to the length of the source operand.

6. The information transfer apparatus of claim 4, further including reading means and writing means for performing reading and writing operations as parallel operations.

7. A method for transferring information in the form of source operand data in accordance with data transfer instructions, comprising the steps of:
   a) storing in a first register a source address indicating the source of the data to be transferred;
   b) storing in a second register a destination address indicating the destination to which the data will be transferred;
   c) storing in a third register data indicative of the source operand length;
   d) generating in a given machine cycle an overlap processing unnecessary signal indicating in a first logic state that overlap processing is unnecessary and that the transfer instruction may be executed by word-by-word processing, and indicating in a second logic state that the selection between word-by-word and byte-and-byte transfer is to be performed in a later machine cycle;
   e) detecting non-identify between predetermined bits indicative of the source address and other predetermined bits indicative of the destination address;
   f) detecting identity between bits in the source address and bits in the destination address;
   g) detecting whether a predetermined bit in the source address or the destination address is a "0" or a "1"; and
   h) comparing the magnitude of the difference between said destination and said source address with that of a source operand length and generating an overlap processing request signal indicating in a fist logic stat that a data transfer instruction is to be executed in a byte-by-byte manner and in a second logic state that the data transfer instruction is to be executed in a word-by-word manner, said overlap processing unnecessary signal generated in said given machine cycle occurring before generation of said overlap processing request signal generated in said later machine cycle.

* * * * *